(12) United States Patent
Pfeiffer et al.

(10) Patent No.: US 7,788,226 B2
(45) Date of Patent: Aug. 31, 2010

(54) MONITORING AVAILABILITY OF APPLICATIONS

(75) Inventors: Stephen W. Pfeiffer, Schriesheim (DE); Christiane Kettschau, Leimen (DE); Julian Droescher, Walldorf (DE)

(73) Assignee: SAP AG, Walldorf (DE)

( * ) Notice: Subject to any disclaimer, the term of this patent is extended or adjusted under 35 U.S.C. 154(b) by 288 days.

(21) Appl. No.: 11/026,617

(22) Filed: Dec. 30, 2004

(65) Prior Publication Data

US 2006/0149729 A1 Jul. 6, 2006

(51) Int. Cl.
*G06F 7/00* (2006.01)
*G06F 17/00* (2006.01)

(52) U.S. Cl. .................. 707/634; 707/633; 707/690
(58) Field of Classification Search ............ 707/1, 707/4, 104.1; 709/217; 711/100; 717/127
See application file for complete search history.

(56) References Cited

U.S. PATENT DOCUMENTS

| | | | |
|---|---|---|---|
| 6,061,721 A | 5/2000 | Ismael et al. | |
| 6,061,740 A * | 5/2000 | Ferguson et al. | 709/246 |
| 6,083,281 A | 7/2000 | Diec et al. | |
| 6,134,581 A | 10/2000 | Ismael et al. | |
| 6,144,967 A | 11/2000 | Nock | |
| 6,205,476 B1 | 3/2001 | Hayes, Jr. | |
| 6,212,520 B1 | 4/2001 | Maruyama et al. | |
| 6,260,187 B1 | 7/2001 | Cirne | |
| 6,272,537 B1 | 8/2001 | Kekic et al. | |
| 6,289,506 B1 | 9/2001 | Kwong et al. | |
| 6,308,208 B1 | 10/2001 | Jung et al. | |
| 6,356,931 B2 | 3/2002 | Ismael et al. | |
| 6,389,464 B1 | 5/2002 | Krishnamurthy et al. | |
| 6,466,973 B2 | 10/2002 | Jaffe | |
| 6,539,501 B1 | 3/2003 | Edwards | |
| 6,553,403 B1 | 4/2003 | Jarriel et al. | |
| 6,567,809 B2 | 5/2003 | Santosuosso | |
| 6,664,978 B1 | 12/2003 | Kekic et al. | |
| 6,681,232 B1 | 1/2004 | Sistanizadeh | |
| 6,738,933 B2 | 5/2004 | Fraenkel et al. | |
| 6,742,178 B1 | 5/2004 | Berry et al. | |
| 6,772,178 B2 | 8/2004 | Mandal et al. | |
| 6,789,257 B1 | 9/2004 | MacPhail | |
| 6,792,460 B2 * | 9/2004 | Oulu et al. | 709/224 |
| 6,802,067 B1 | 10/2004 | Camp et al. | |

(Continued)

OTHER PUBLICATIONS

"U.S. Appl. No. 10/813,788 Final Office Action Mailed Nov. 26, 2007 for": (Nov. 26, 2007), Whole Document.

(Continued)

*Primary Examiner*—Apu M Mofiz
*Assistant Examiner*—Susan Y Chen
(74) *Attorney, Agent, or Firm*—Blakely Sokoloff Taylor & Zafman

(57) ABSTRACT

A system and method for monitoring availability of applications. According to an embodiment of the invention, a method includes providing a set of monitoring instructions to an agent, with the set of monitoring instructions including a time stamp and the set of monitoring instructions regarding monitoring of the availability of applications. The method includes receiving a status inquiry from the agent, the inquiry including the time stamp, comparing the time stamp received from the agent to a time stamp for up-to-date monitoring instructions, and sending the up-to-date monitoring instructions to the agent if the time stamp of the up-to-date monitoring instructions is later than the time stamp received from the agent.

21 Claims, 6 Drawing Sheets

U.S. PATENT DOCUMENTS

| | | | |
|---|---|---|---|
| 6,834,301 | B1 | 12/2004 | Hanchett |
| 6,851,118 | B1 | 2/2005 | Ismael et al. |
| 6,853,995 | B2 | 2/2005 | Matsuzaki et al. |
| 6,880,125 | B2 | 4/2005 | Fry |
| 6,925,631 | B2 | 8/2005 | Golden |
| 6,990,601 | B1 | 1/2006 | Tsuneya et al. |
| 7,000,235 | B2 | 2/2006 | Mandal et al. |
| 7,017,051 | B2 | 3/2006 | Patrick |
| 7,017,162 | B2 | 3/2006 | Smith et al. |
| 7,024,474 | B2 | 4/2006 | Clubb et al. |
| 7,051,324 | B2 | 5/2006 | Gissel et al. |
| 7,058,558 | B2 | 6/2006 | Reichenthal |
| 7,062,540 | B2 | 6/2006 | Reddy et al. |
| 7,069,267 | B2 | 6/2006 | Spencer, Jr. |
| 7,082,464 | B2 | 7/2006 | Hasan et al. |
| 7,085,851 | B2 | 8/2006 | Nusbickel et al. |
| 7,086,065 | B1 | 8/2006 | Yeluripati et al. |
| 7,150,014 | B2 | 12/2006 | Graupner |
| 7,152,104 | B2 | 12/2006 | Musante et al. |
| 7,174,370 | B1 | 2/2007 | Saini et al. |
| 7,197,559 | B2 | 3/2007 | Goldstein et al. |
| 7,200,588 | B1 | 4/2007 | Srivastava et al. |
| 7,206,827 | B2 | 4/2007 | Viswanath et al. |
| 7,209,963 | B2 * | 4/2007 | Burton et al. ............... 709/223 |
| 7,496,896 | B2 | 2/2009 | Bley et al. |
| 2002/0029298 | A1 | 3/2002 | Wilson |
| 2002/0075325 | A1 | 6/2002 | Allor et al. |
| 2002/0170036 | A1 | 11/2002 | Cobb et al. |
| 2002/0186238 | A1 | 12/2002 | Sylor et al. |
| 2003/0041142 | A1 | 2/2003 | Zhang et al. |
| 2003/0110252 | A1 | 6/2003 | Yang-Huffman |
| 2003/0120593 | A1 | 6/2003 | Bansal et al. |
| 2003/0167304 | A1 | 9/2003 | Zhu et al. |
| 2003/0177477 | A1 | 9/2003 | Fuchs |
| 2004/0003122 | A1 | 1/2004 | Melillo |
| 2004/0019662 | A1 | 1/2004 | Viswanath et al. |
| 2004/0019669 | A1 | 1/2004 | Viswanath et al. |
| 2004/0019684 | A1 * | 1/2004 | Potter et al. ................. 709/227 |
| 2004/0022237 | A1 | 2/2004 | Elliott et al. |
| 2004/0058652 | A1 * | 3/2004 | McGregor et al. ....... 455/67.13 |
| 2004/0064552 | A1 * | 4/2004 | Chong et al. ................ 709/224 |
| 2004/0078722 | A1 | 4/2004 | Pfeiffer et al. |
| 2004/0123279 | A1 | 6/2004 | Boykin et al. |
| 2004/0148610 | A1 | 7/2004 | Tsun et al. |
| 2004/0158837 | A1 | 8/2004 | Sengodan |
| 2004/0215649 | A1 | 10/2004 | Whalen et al. |
| 2004/0230973 | A1 | 11/2004 | Cundiff, Jr. et al. |
| 2004/0249613 | A1 | 12/2004 | Sprogis et al. |
| 2004/0268314 | A1 | 12/2004 | Kollman et al. |
| 2005/0010608 | A1 | 1/2005 | Horikawa |
| 2005/0038889 | A1 | 2/2005 | Frietsch |
| 2005/0039171 | A1 | 2/2005 | Avakian et al. |
| 2005/0097110 | A1 | 5/2005 | Nishanov et al. |
| 2005/0102536 | A1 | 5/2005 | Patrick et al. |
| 2005/0132337 | A1 | 6/2005 | Wedel et al. |
| 2005/0172306 | A1 * | 8/2005 | Agarwal et al. ............. 719/328 |
| 2005/0216584 | A1 | 9/2005 | Chisholm |
| 2005/0234931 | A1 | 10/2005 | Yip et al. |
| 2005/0234967 | A1 | 10/2005 | Draluk et al. |
| 2005/0257157 | A1 * | 11/2005 | Gilboa et al. ............... 715/747 |

OTHER PUBLICATIONS

"OA mailed Jan. 18, 2008 for U.S. Appl. No. 10/814,907", Jan. 18, 2008, Whole Document.

"FOA mailed Jun. 8, 2007 for U.S. Appl. No. 10/748,779", Jun. 6, 2007, Whole Document.

"OA mailed Dec. 19, 2007 for U.S. Appl. No. 10/748,779", Whole Document.

"OA mailed Dec. 29, 2006 for U.S. Appl. No. 10/748,779", Whole Document.

"OA mailed Jun. 29, 2006 for U.S. Appl. No. 10/748,779", Whole Document.

"FOA mailed Oct. 16, 2007 for U.S. Appl. No. 10/748,951", Whole Document.

"OA mailed Jun. 12, 2007 for U.S. Appl. No. 10/748,951", Whole Document.

"FOA mailed Jul. 2, 2007 for U.S. Appl. No. 10/813,788", Whole Document.

"OA mailed Jan. 25, 2007 for U.S. Appl. No. 10/813,788", Whole Document.

"Adding Systems to the Availability Monitoring Manually", http://help.sap.com/saphelp_erp2004/helpdata/en/38/9e0fe5d7980fffe1000009b3810a5/c..., Adding Systems to the Availability Monitoring Manually (SAP Library—The Alert Monitoring), (Downloaded Dec. 14, 2004), Whole Document.

"Alert Monitoring of the J2EE Engine Using CCMS", http://help.sap.com/saphelp_webas630/helpdata/en/92/ef30241c0f4a41959390a27e286ce..., Alert Monitoring of the J2EE Engine Using CCMS—SAP Library, (Downloaded Dec. 14, 2004), Whole Document.

"Availability and Performance Overview Monitor", http://help.sap.com/saphelp_erp2004/helpdata/en/ae/cd823bd26a5c42e10000000a114084..., Availability and Performance Overview Monitor (SAP Library—The Alert Monitor), (Downloaded Dec. 14, 2004), Whole Document.

"Availibility Monitoring with CCMSPING", http://help.sap.com/saphelp_erp2004/helpdata/en/38/9e3337d7840ffee10000009b3810a5/..., Availability Monitoring with CCMSPING (SAP Library—The Alert Monitor), (Downloaded Dec. 14, 2004), Whole Document.

"CCMS Agents": http://help.sap.com/saphelp_nw04/helpdata/en/48/6a76607a7c914074ad6c7b6f5a26/frameset.htm, Whole Document.

"CCMS Monitoring Architecture: Preconfigured Monitors for the Alert Monitor", *SAP Web Application Server 6.20*, (Nov. 16, 2001), Whole Document.

"CCMS: Informix", http://help.sap.com/saphelp_erp2004/helpdata/en/73/61c850800e25478d24696196a969a5..., CCMS: Informix (SAP Library—CCMS: Informix), (Downloaded Dec. 14, 2004), Whole Document.

"Changing Monitoring Setting of Servers and Groups", http://help.sap.com/saphelp_erp2004/helpdata/en/6c/d667aa73bb9c428e9786eaf559f7ea/..., Changing Monitoring Setting of Servers and Groups (SAP Library—The Alert Monitor), (Downloaded Dec. 14, 2004), Whole Document.

"Configuring Availability Monitoring", http://help.sap.com/saphelp_erp2004/helpdata/en/38/9e100dd7980fffe10000009b3810a5/..., Configuring Availability Monitoring (SAP Library—The Alert Monitor), (Downloaded Dec. 14, 2004), Whole Document.

"Creating and Changing a Monitoring Pause", http://help.sap.com/saphelp_erp2004/helpdata/en/73/098488227c384f97c564225737108c..., Creating and Changing a Monitoring Pause (SAP Library—The Alert Monitor), (Downloaded Dec. 14, 2004), Whole Document.

"Creating and Changing Monitoring Rules", http://help.sap.com/saphelp_erp2004/helpdata/en/40/17fd8c1754324b81da9027f1bdbb75/..., Creating and Changing Monitoring Rules (SAP Library—The Alert Monitor), (Downloaded Dec. 14, 2004), Whole Document.

"Installing and Registering CCMS Agents", http://help.sap.com/saphelp_nw04/helpdata/en/48/6a76607a7c91409474ad6c7b6f5a26/framset.htm, SAP Library, (Downloaded Dec. 14, 2004), Whole Document.

"Installing Availability Agent CCMSPING", http://helpsab.com/saphelp_erp2004/helpdata/en/79/498e3bae1d9e7ae10000000a114084... Installing Availability Agent CCMSPING (SAP Library—The Alert Monitor), (Downloaded Dec. 14, 2004), Whole Document.

"Monitoring", http://help.sap.com/saphelp_webas630/helpdata/en/68/f4bc3deaf28d33e10000000a11405..., Monitoring (SAP Library—J2EE Technology in SAP Web Application Server), (Downloaded Dec. 14, 2004), Whole Document.

"Operating System Monitor", http://help.sap.com/saphelp_nw04/helpdata/en/55/b5b93b5bb349fe10000000a114084/framset.htm, SAP Library, (Downloaded Dec. 14, 2004), Whole Document.

"The Alert Monitoring", http://help.sap.com/saphelp_nw2004s/helpdata/en/28/83493b6b82e908e10000000a11402f/content.htm, SAP Library, (Downloaded Dec. 14, 2004), Whole Document.

"The Monitoring Architecture: Concept", http://help.sap.com/saphelp_nw04/helpdata/en/c4/3a7da1505211d1895500000e829fbbd/frameset.htm, SAP Library, (Downloaded Feb. 27, 2008), Whole Document.

"The SAP J2EE Engine Monitoring Architecture", http://help.sap.com/saphelp_webas630/helpdata/en/83/6b20165833fa43b28f0349a4d3108..., The SAP J2EE Engine Monitoring Architecture (SAP Library—J2EE Technology in SAP..., (Dowbloaded Dec. 14, 2004), Whole Document.

"The Source for Developers: Core Java Java Management Extensions (JMX)", *Sun Microsystems, Inc.*, "The Source for Developers: Core Java Java Management Extensions (JMX)" 2 pages, http://java.sun.com/products/JavaManagement/printed Apr. 2, 2004., 2 pages.

Chang, L. , et al., "A Network Status Monitoring System Using Personal Computer", Chang, L.: Chan. W.-L.: Chang, J.: Ting, P.: Netrakanti, M., "A Network Status Monitoring System Using Personal Computer", *Global Telecommunications Conference, 1989, and Exhibition, 'Communications Technology for the 1990 and Beyond'. Globecom '89., IEEE*, (1989), pp. 201-206.

Hampton, Kip , "High Performance XML Parsing with SAX", Published on XML.com by Feb. 14, 2001.

McLaughlin, Brett , "Tip: Set up a SAX Parser", *Published by International Business Machines Corporation on Jul. 2, 2003*.

Final Office Action, Final Office Action mailed Jun. 13, 2008 for Pending U.S. Appl. No. 10/814 907.

USPTO, "OA Mailed Jul. 31, 2008 for U.S. Appl. No. 10/813,788", Whole Document.

Final Office Action for U.S. Appl. No. 10/748,779, Mailed May 14, 2008, 15 pages.

Final Office Action for U.S. Appl. No. 10/813,788, Mailed Feb. 19, 2009, 18 pages.

Final Office Action for U.S. Appl. No. 10/748,779, Mailed Apr. 16, 2009, 13 pages.

Final Office Action for U.S. Appl. No. 10/749,740, Mailed Apr. 15, 2009, 22 pages.

Notice of Allowance for U.S. Appl. No. 10/748,951, Mailed Apr. 20, 2009, 26 pages.

Final Office Action for U.S. Appl. No. 10/814,907; Mailed Jun. 5, 2009; 31 pages.

Final Office Action for U.S. Appl. No. 10/748,774 Mailed Jun. 9, 2009; 20 pages.

Non-Final Office Action for U.S. Appl. No. 10/814,907; Mailed Nov. 13, 2008; 24pages.

Non-Final Office Action for U.S. Appl. No. 10/748,779, Mailed Sep. 26, 2008; 16 pages.

Final Office Action for U.S. Appl. No. 10/749,740, Mailed Oct. 27, 2008; 22 pages.

Non-Final Office Action for U.S. Appl. No. 10/814,907; Mailed Oct. 21, 2009; 32 pages.

Non-Final Office Action for U.S. Appl. No. 10/748,774 Mailed Sep. 8, 2009; 14 pages.

* cited by examiner

MONITORING AVAILABILITY OF APPLICATIONS

TECHNICAL FIELD

Embodiments of the invention generally relate to the field of client/server systems and, more particularly, to a system and method for monitoring availability of servers.

BACKGROUND

In a large enterprise, software components may perform business-critical tasks, with the components and often forming large software landscapes comprised of many components spread over many host systems operating together in a network. Because the components are software components and run as applications on host operating systems, their availability—their ability to perform the functions for which they are intended—is not easily monitorable using standard operating system monitoring tools, which have no knowledge of application-level software.

To address software components, certain systems include facilities for monitoring the availability of software components, with an agent being used to provide monitoring. However, the existing facilities are generally inadequate for availability monitoring purposes. In conventional systems, the frequency of availability monitoring is generally too infrequent. If a monitoring agent requires constant instruction, then the operation of the agent will require a great amount of processing and communications time. Further, the deployment of a single agent program to conduct actual availability checks may be inadequate for monitoring needs.

SUMMARY OF THE INVENTION

A system and method for implementation of monitoring availability of servers.

According to a first embodiment of the invention, a method includes providing a set of monitoring instructions regarding monitoring of the availability of applications to an agent, with the monitoring instructions including a time stamp value. The method further provides for receiving an inquiry from the agent regarding the status of the monitoring instructions, with the inquiry including the time stamp value. The time stamp value is compared to a time value for a current set of instructions, and, if the time value for the current instructions is later than the received time stamp, the current instructions are sent to the agent.

Under a second embodiment of the invention, a system includes a monitoring agent, the monitoring agent to monitor the availability of applications according to a received work list, with the work list including an effective time value. The system further includes a central monitoring system, the central monitoring system maintaining a current work list for the agent. The current work list includes an effective time value, and the control system is to send the current work list to the agent if the effective time value for the current work list is later than the effective time value of the monitoring agent's work list.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
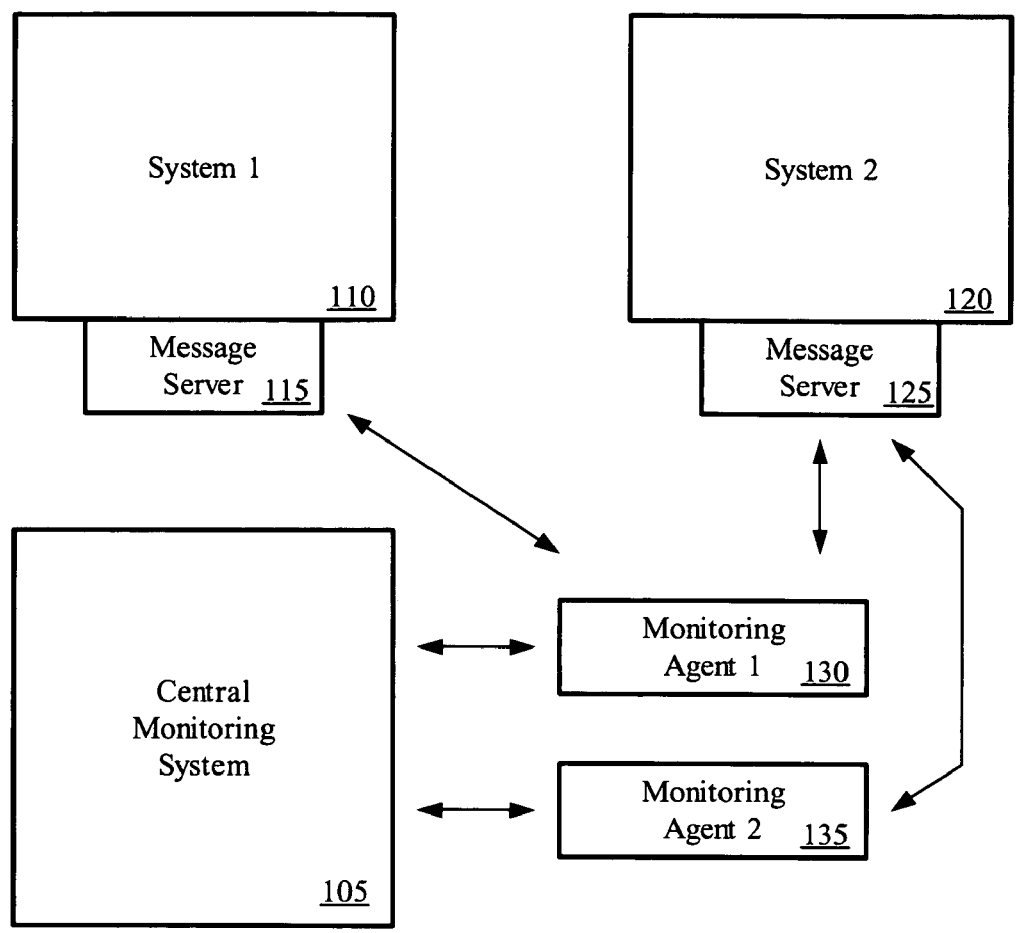
FIG. 1 is an illustration of an embodiment of a monitoring system.

Embodiments of the invention are generally directed to a system and method for monitoring availability of applications.

As used herein, "application" means a computer application or program.

In one embodiment of the invention, an autonomous agent is provided for monitoring of the availability of applications. In one embodiment, an agent monitors the availability of applications using a set of instructions, which may be a work list of systems to monitor.

In one embodiment of the invention, a monitoring agent periodically or upon the occurrence of some event makes an inquiry to a central monitoring system to determine whether the monitoring agent's work list is current. In one embodiment, the monitoring agent provides a time stamp to the central monitoring system, the time stamp representing an effective time for the work list of the monitoring agent. In other embodiments, another designation, such as a version number, may be used to represent the status of the work list.

In one embodiment, a central monitoring system receives an inquiry from a monitoring agent and determines the status of the work list of the monitoring agent by comparing a time stamp of the work list with a time stamp for a current work list maintained by the central monitoring system. In one embodiment, if the time stamp of the current work list is later than the time stamp of the work list held by the monitoring agent, the central monitoring system determines that the monitoring agent requires a new work list and sends the new work list to the monitoring agent. The monitoring agent then conducts monitoring activities according to the new work list. In one embodiment, if the time stamp of the current work list is not later than the time stamp of the monitoring agent's work list, the central monitoring system determines that the monitoring agent does not require a new work list and sends a "no change" message to the monitoring agent. The monitoring agent then continues monitoring activities according to the work list held by the monitoring agent.

In one embodiment of the invention, a mechanism is provided for running several monitoring agents at the same time. In one embodiment, multiple agents may have either overlapping or separate workloads for operations. In one embodiment, a system may switch back and forth between monitoring agents. In one embodiment, a monitoring agent may be assigned to a group of systems. For example, a first agent is assigned to a first group of systems, a second agent is assigned to a second group of systems, and so on, with possible overlap existing between the groups assigned to the agents. Under an embodiment of the invention, a cross check of availability of systems may be made using multiple monitoring agents. For example, a first agent in a first location and a second agent in a second location may both check system availability for a given system or set of systems, thereby providing views of availability from multiple locations.

In one embodiment of the invention, each agent of a number of agents makes a request for workload update periodically, or upon some other event, and includes a time stamp for the current workload. Each agent then receives confirmation that there is no change in workload, or receives a new workload. Using such method, a central monitoring system is able to utilize multiple agents for monitoring with minimal overhead in directing the agents and minimal communications to maintain current status.

In one embodiment of the invention, an agent operates asynchronously, operating with its own knowledge of the monitoring tasks. In one embodiment, an agent acts independently, without requiring constant direction. In the embodiment, the agent operates with a workload and periodically inquires about an update, with the inquiry providing a time when the current workload became effective. The agent either receives an updated workload or receives a message indicating there is no change. If a no change message is received, the agent continues with the current tasks. If a change message is received, the agent begins the new workload. In one embodiment, the agent pushes data back to the central control, rather than requiring that data be pulled from the agent. The asynchronous and autonomous operation of the agent provides monitoring data without requiring extensive command processes.

In one example, an embodiment of the invention may be implemented in the CCMS (Computing Center Management System) Monitoring Architecture of SAP AG for monitoring the availability of SAP software components. In a CCMS system, an agent designated as a CCMSPING agent program may be deployed to conduct availability checks. In one embodiment, a CCMSPING agent is independent and operates autonomously. The agent conducts availability checks on its own according to a customizable frequency on a work list of software components to check. In one embodiment, multiple such agents may operate simultaneously. To allow flexible distribution of workload and to allow testing of availability from the point of view of various sites, multiple agents may work in parallel on separate work lists, may work in parallel on shared work lists, or may operate with a combination of shared and separate work lists. In one embodiment, each of the agents operates independently of a central monitoring system. In one embodiment, the work lists of multiple agents are synchronized by a central monitoring system.

In one embodiment of the invention, monitored applications may reside on various different computer platforms. In one embodiment, a monitored application may be implemented in a J2EE™ (Java™2 Platform, Enterprise Edition) platform. The J2EE platform is described in the J2EE specification, including as provided in version 1.4, Nov. 24, 2003. In another embodiment, an application may be implemented on an ABAP (Advanced Business Application Programming) platform of SAP AG. In another embodiment, an application may reside in another type of computer platform.

FIG. 1 is an illustration of an embodiment of a monitoring system. In this illustration, a central monitoring system 105 provides monitoring of application availability for one or more systems, the systems being illustrated as system 1 110 with message server 115, and system 2 120 with message server 125. The monitoring functions are provided by one or more monitoring agents, the monitoring agents being shown as monitoring agent 1 130 and monitoring agent 2 135. For example, monitoring agent 1 130 may monitor the availability of applications on system 1 110 and system 2 120, while monitoring agent 2 130 may monitor the availability of applications on system 2 120. In this example, monitoring agent 1 130 and monitoring agent 2 135 may both monitor the availability of applications on system 2 120, thereby providing cross verification of availability. In an embodiment, the monitoring agents may monitor the availability of applications from different locations, thus monitoring agent 1 130 may engage in monitoring from a first location and monitoring agent 2 135 may engage in monitoring from a second location.

The central monitoring system 105 provides monitoring instructions for the monitoring agents. In one embodiment of the invention, the agents periodically provide inquiries to the central system regarding the state of the monitoring instructions of the agents. In one embodiment, the central system only provides new instructions to monitoring agents when the instructions have changed, based on a time stamp value for the existing instructions.

Figure 2:
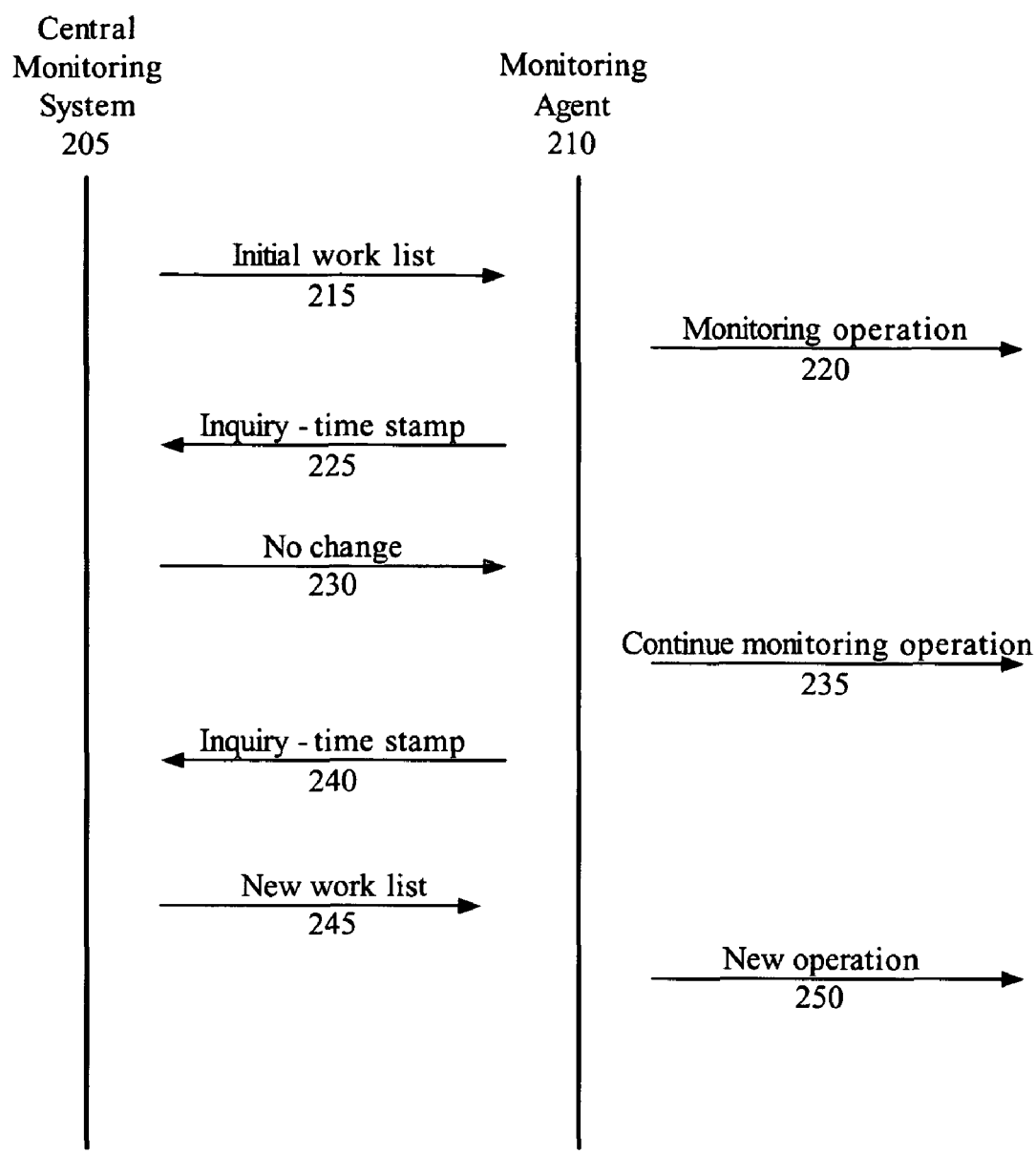
FIG. 2 is an illustration of an embodiment of communications for a central system and a monitoring agent.

FIG. 2 is an illustration of an embodiment of communications for a central system 205 and a monitoring agent 210. In this illustration, an initial work list 215 is provided to the agent, the initial work list representing systems to monitor for the availability of applications. The initial work list includes a time stamp representing the effective status of the initial work list. Based at least in part on the initial work list, the monitoring agent performs an initial monitoring operation 220.

Periodically the monitoring agent 210 will make an inquiry 225 to the central monitoring system 205 to determine whether the current work list of the monitoring agent 210 is current or whether the work list needs to be modified. The inquiry includes the time stamp for the work list. In one example, the central system compares the received time stamp against a time stamp representing an up-to-date work list for the monitoring agent 210. If the central monitoring system 205 determines that the monitoring agent already has the most current work list, then the central system 205 will send a no change instruction 230 to the monitoring agent 210. Based on the no change instruction 230, the monitoring agent 210 continues the initial monitoring operation 235.

In one example, after a certain amount of time has passed, the monitoring agent 210 sends another inquiry 240 to the central monitoring system 205. In this example, the central monitoring system 205 again compares the received time stamp against a time stamp representing a current work list for the monitoring agent 210. In this case, the time stamp for the up-to-date work list is later than the received time stamp, indicating that the monitoring agent 210 does not have the most current work list. The central monitoring system 205 will then send the new work list to the monitoring agent 245, and the monitoring agent 210 will perform the new monitoring operation based at least in part of the new workload instructions 250.

Figure 3:
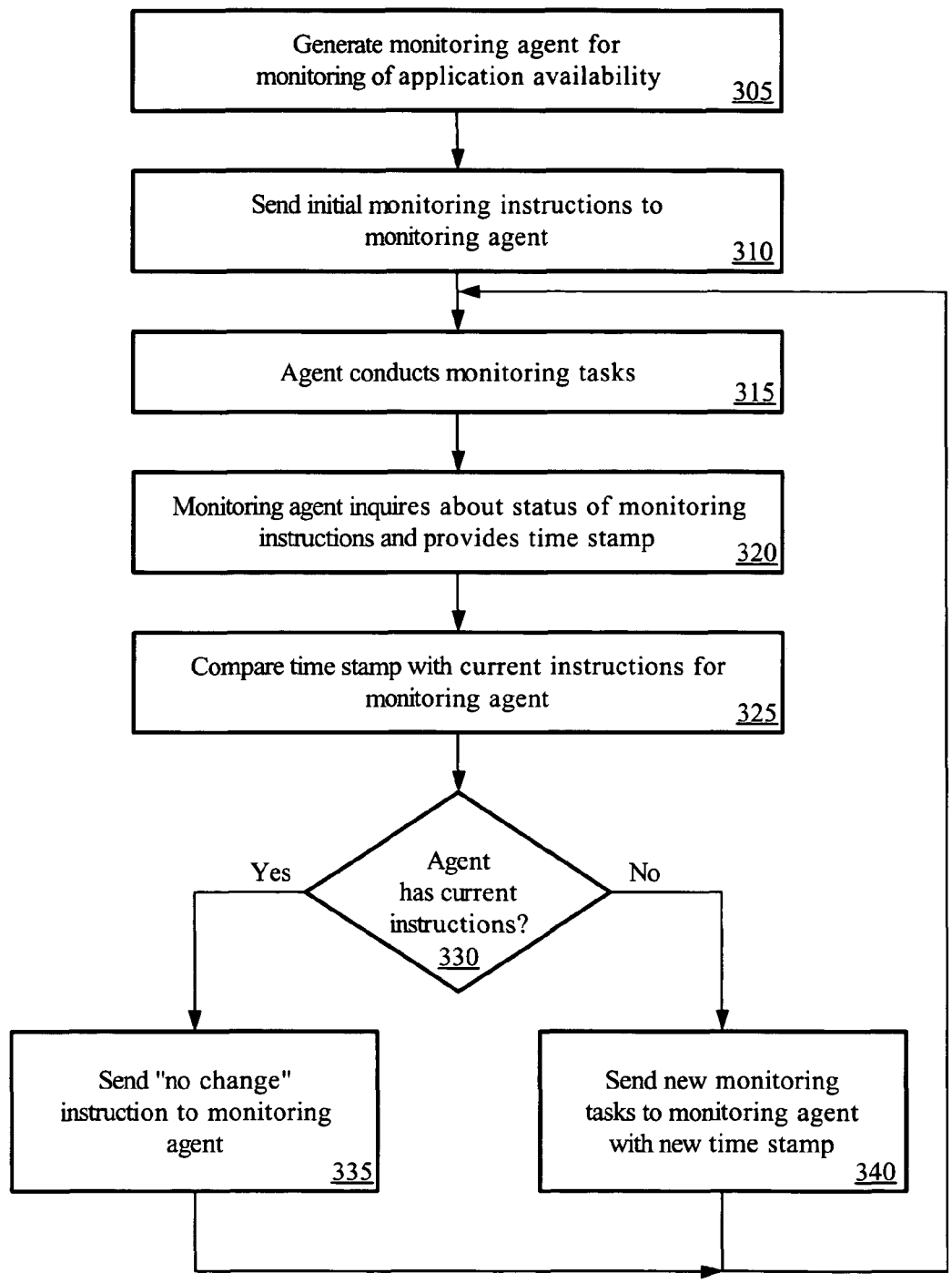
FIG. 3 is a flow chart to illustrate the an embodiment of a process for monitoring the availability of applications.

FIG. 3 is a flow chart to illustrate an embodiment of a process for monitoring the availability of applications. A monitoring agent is generated, with the monitoring agent being intended to monitor the availability of applications 305. An initial set of monitoring instructions is provided to the monitoring agent 310, and the monitoring agent acts to conduct the monitoring tasks provided in the monitoring instructions 315. In an embodiment, the monitoring agent acts autonomously to carry out the received instructions. Periodically the monitoring agent will inquire regarding the status of the monitoring instructions, with the request including the time stamp for the set of instructions that the monitoring agent possesses 320. The time stamp from the monitoring agent is compared with a time for the most current set of monitoring instructions 325 in order to determine whether the monitoring agent already has the current set of instructions. If, according to the comparison of the time stamps, the monitoring agent already has the current monitoring instructions 330, a "no change" message is sent to the monitoring agent 335. The monitoring agent will continue conducting the monitoring tasks 315 using the previously obtained monitoring instructions. If the instructions for the monitoring agent are not current 330, then new monitoring instructions are sent to the monitoring agent, with the monitoring instructions including a new time stamp 340. The monitoring agent will then conduct the monitoring tasks 315 using the new set of monitoring instructions.

Figure 4:
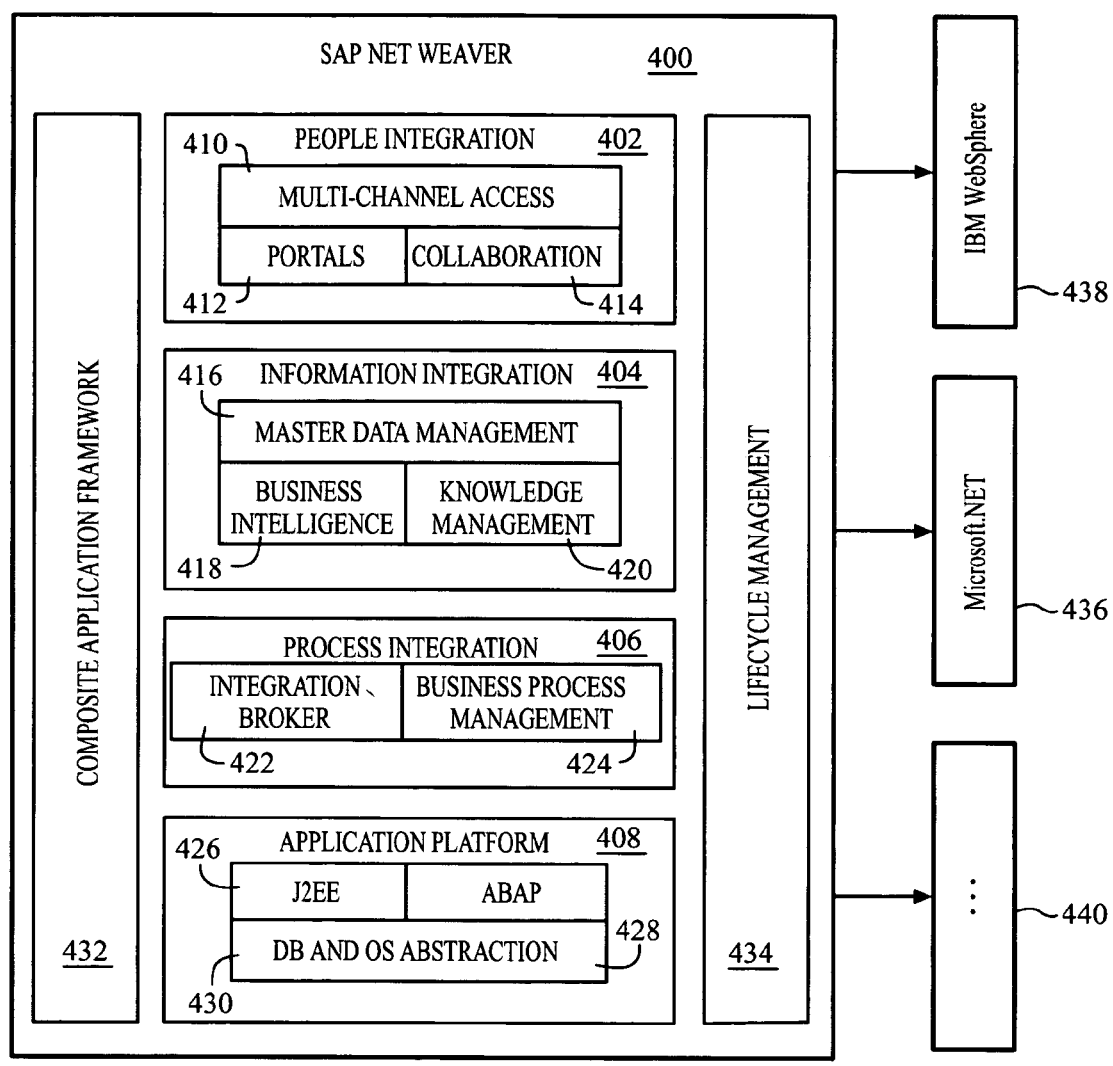
FIG. 4 is a diagram illustrating an embodiment of a system architecture.

FIG. 4 is a diagram illustrating an embodiment of a system architecture. In one embodiment, the diagram illustrates core components of the SAP NetWeaver architecture 400, in which a web service interface for external management may be implemented. The system architecture 400 comprises various SAP platforms that are merged together to provide the integration of people, information, and processes in one solution. The architecture 400 includes people integration 402, information integration 404, process integration 406, and an application platform 408.

People integration 402 is performed using a portal solution 412 and a platform to work in collaboration 414. Users are provided a multi-channel access 410 to ensure mobility. Examples of the portal solution 412 include SAP Enterprise Portal, SAP Mobile Engine, and Collaboration Package for SAP Enterprise Portal. Information integration 404 refers to the conversion of information into knowledge. Information integration 404 provides efficient business intelligence 418 and knowledge management 420 using, for example, SAP products such as Business Information Warehouse (BW) and Knowledge Management (KM). Further, consolidation of master data management beyond system boundaries is performed using SAP's Master Data Management (MDM) 416. Process integration 406 refers to optimized process management using integration broker or SAP exchange infrastructure 422 and business process management 424 techniques. Examples of products to perform process integration 406 include Exchange Infrastructure (XI) and Business Process Management (BPM).

An application platform 408 may include SAP's Web Application Server (Web AS), which is the basis for SAP applications. Web AS, which may be independent of the database and operating system 430, includes a J2EE engine 426 in combination with the proprietary ABAP (Advanced Business Application Programming) engine or instance 428 to further enhance the application platform 408.

The architecture 400 further includes a composite application framework 432 to provide various open interfaces (APIs) and a lifecycle management 434, which is an extension of a previously existing transport management system (TMS). As illustrated, the architecture 400 further provides communication with Microsoft.NET 436, International Business Machine (IBM) WebSphere 438, and other such systems 440.

Figure 5:
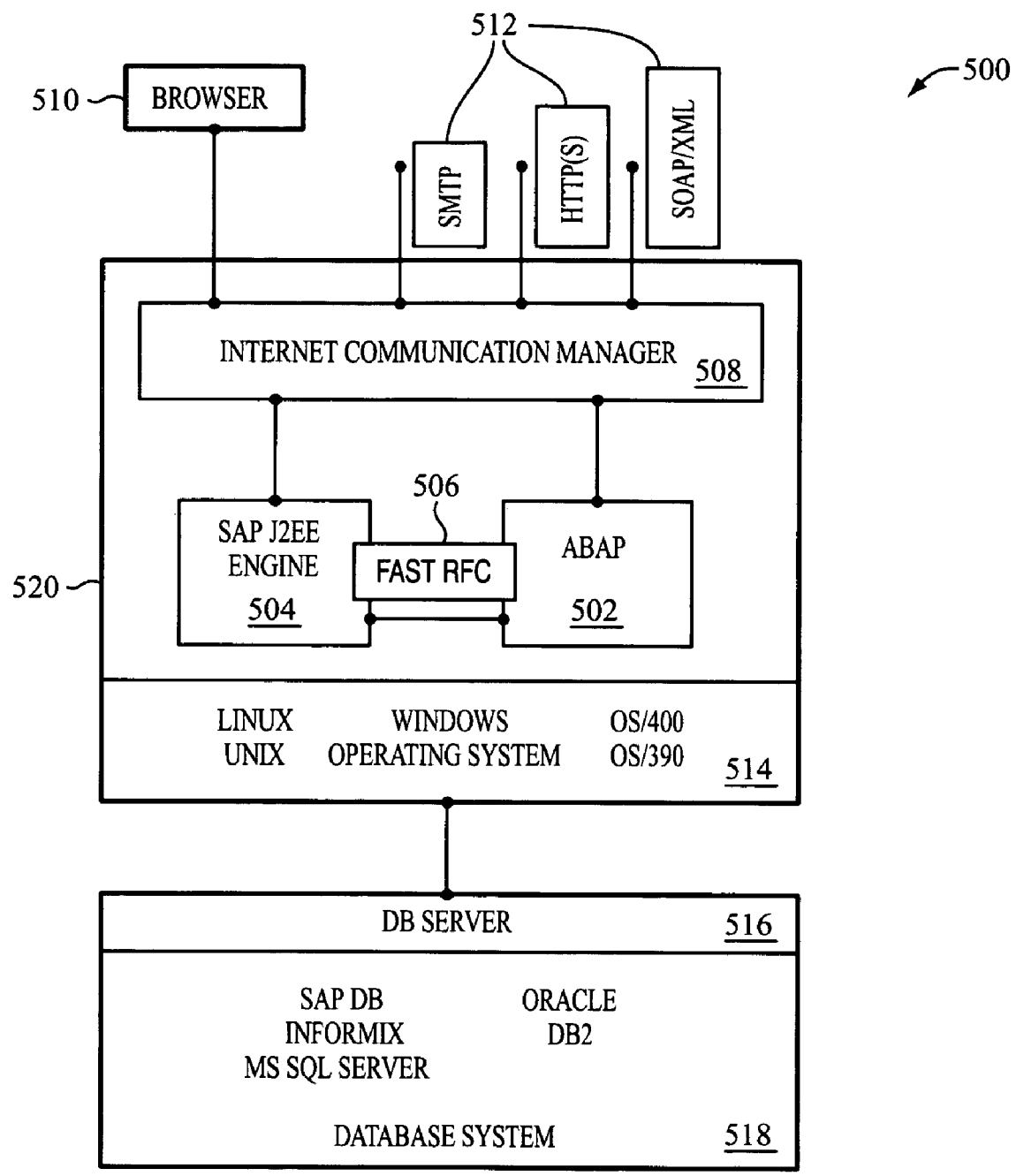
FIG. 5 is a block diagram illustrating an embodiment of an architecture including a Web Application Server.

FIG. 5 is a block diagram illustrating an embodiment of an architecture including a Web Application Server. In this illustration, an architecture 500 serves as an application platform (which may be, for example, the application platform 608 of provided in FIG. 2) for SAP NetWeaver and other SAP products. The architecture 500 includes a Web AS 520 having an ABAP program engine 502, which provides the ABAP development and runtime environment, with the dependability, scalability, and inter-process independence of operating systems 514 and database systems 518. The operating system 514 may include LINUX, UNIX, Windows, OS/390, OS/400, and other such operating systems. The database system 518 may include SAP database (SAP DB), Informix, Oracle, DB2, and other such database systems. The database system 518 is based on a database server 516, such as Microsoft Sequential Query Language (MS SQL) server.

The Web AS 520 with ABAP engine 502 further includes a J2EE program engine 504. The J2EE may support one or more program instances. The J2EE engine 504 is in communication with the ABAP engine 502 via a fast Remote Function Call (RFC) connection 506. The ABAP engine 502 and the J2EE engine 504 are further in communication with an Internet Communication Manager (ICM) 508. The ICM 508 is provided for handling and distributing queries to various individual components of the architecture 500. The architecture 500 further supports a browser 510, such as Microsoft Internet Explorer, Netscape Navigator, and other modified variations of mobile end devices, such as personal digital assistants (PDAs), pocket computers, smart cell phones, other hybrid devices, and the like. The Web AS 520 also supports various protocols and standards 512, such as HyperText Markup Language (HTML), eXtensible Markup Language (XML), Wireless Markup Language (WML), Hypertext Transfer Protocol (HTTP) and Hypertext Transfer Protocol, Secure (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like.

Figure 6:
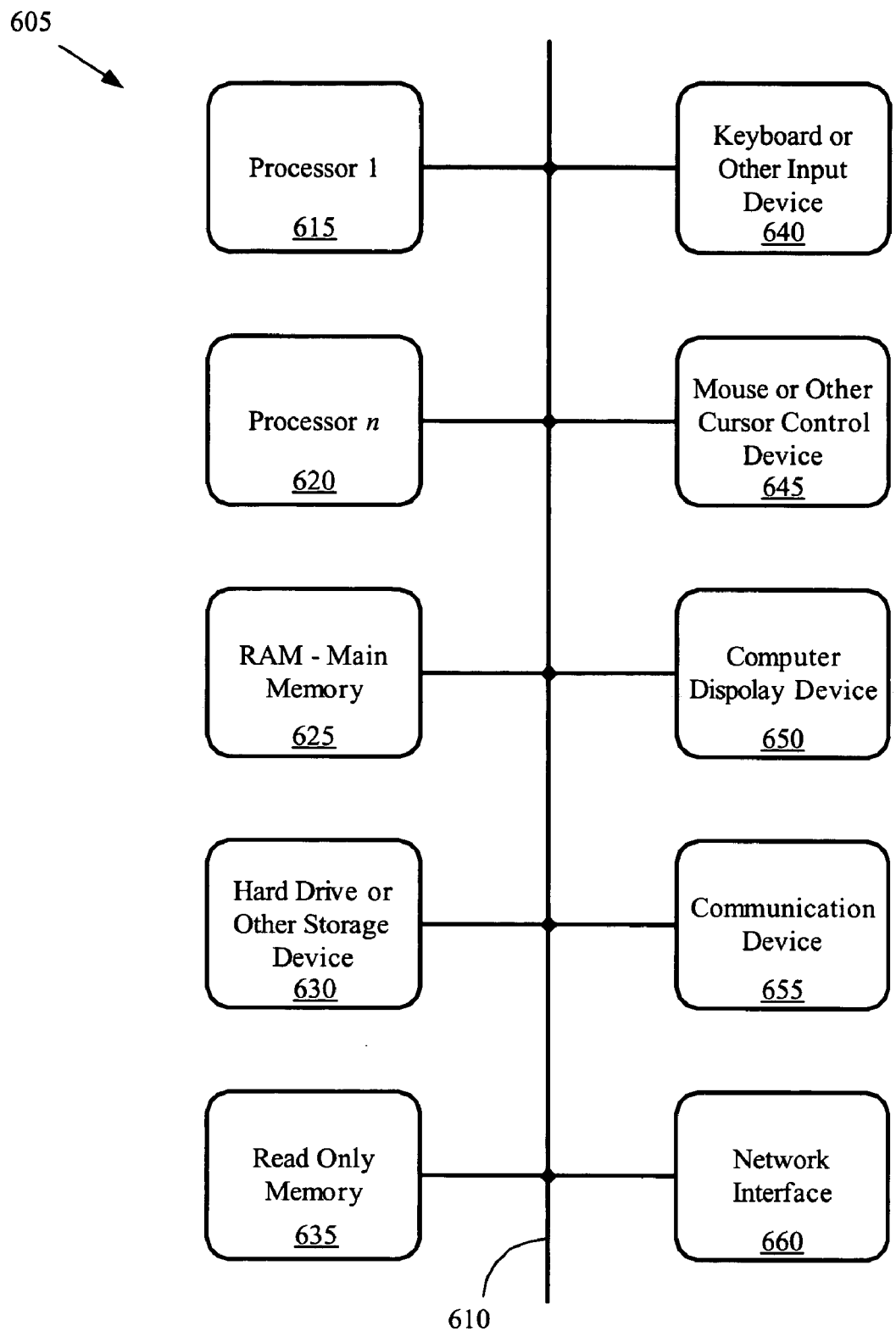
FIG. 6 is an illustration of an embodiment of a computer system that may include a monitored application.

FIG. 6 is an illustration of an embodiment of a computer system that may include a monitored application. In this illustration, a computer 605 comprises a bus 610 or other means for communicating data. The computer 605 includes one or more processors, illustrated as shown as processor 1 615 through processor n 620 to process information.

The computer 605 further comprises a random access memory (RAM) or other dynamic storage as a main memory 625 to store information and instructions to be executed by the processors 615 through 620. The RAM or other main memory 625 also may be used for storing temporary variables or other intermediate information during execution of instructions by the processors 615 through 620.

A hard drive or other storage device or computer-readable storage medium 630 may be used by the computer 605 for storing information and instructions. The storage device or computer-readable storage medium 630 may include a magnetic disk or optical disc and its corresponding drive, flash memory or other nonvolatile memory, or other memory device. Such elements may be combined together or may be separate components. The computer 605 may include a read only memory (ROM) 635 or other static storage device for storing static information and instructions for the processors 615 through 620.

A keyboard or other input device 640 may be coupled to the bus 610 for communicating information or command selections to the processors 615 through 620. The input device 640 may include a keyboard, a keypad, a touch-screen and stylus, a voice-activated system, or other input device, or combinations of such devices. The computer may further include a mouse or other cursor control device 645, which may be a mouse, a trackball, or cursor direction keys to communicate direction information and command selections to the processors and to control cursor movement on a display device. The computer 605 may include a computer display device 650, such as a cathode ray tube (CRT), liquid crystal display (LCD), or other display technology, to display information to a user. In some environments, the display device may be a touch-screen that is also utilized as at least a part of an input device. In some environments, the computer display device 650 may be or may include an auditory device, such as a speaker for providing auditory information.

A communication device 655 may also be coupled to the bus 610. The communication device 655 may include a modem, a transceiver, a wireless modem, or other interface device. The computer 605 may be linked to a network or to other device using via an interface 660, which may include links to the Internet, a local area network, or another environment. The computer 605 may comprise a server that connects to multiple devices. In one embodiment the computer 605 comprises a Java compatible server that is connected to user devices and to external resources.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
   generating by a central monitoring system a plurality of monitoring agents including a first monitoring agent, each of the plurality of monitoring agents operating autonomously from the central monitoring system in carrying out monitoring tasks;
   providing by the central monitoring system a first set of monitoring instructions to the first monitoring agent, the first set of monitoring instructions instructing the first monitoring agent to monitor availability of a first group of computer applications run on one or more processors;
   receiving at the central monitoring system a status inquiry from the first monitoring agent regarding the status of the first set of monitoring instructions, the inquiry including a first time stamp for the first set of monitoring instructions, the first time stamp comprising a time that the first set of monitoring instructions became effective;
   comparing by the central monitoring system the first time stamp received from the first monitoring agent to a second time stamp, the second time stamp being a time stamp for an up-to-date set of monitoring instructions for the first monitoring agent that is held by the central monitoring system;
   if the comparison of the time stamps indicates that the second time stamp is later than the first time stamp, determining that the first monitoring agent requires new updated monitoring instructions and sending the up-to-date set of monitoring instructions from the central monitoring system to the first monitoring agent to replace the first set of monitoring instructions; and
   if the comparison of the time stamps indicates that the second time stamp is not later than the first time stamp, sending a message to the first monitoring agent indicating that the first set of monitoring instructions is up-to-date.

2. The method of claim 1, further comprising providing a second set of monitoring instructions to a second monitoring agent of the plurality of monitoring agents, the second set of monitoring instructions instructing the second monitoring agent to monitor availability of a second group of computer applications.

3. The method of claim 2, wherein the first group of computer applications monitored pursuant to the first set of monitoring instructions and the second group of computer applications monitored pursuant to the second set of monitoring instructions overlap in whole or in part.

4. The method of claim 3, wherein the first set of monitoring instructions and the second set of monitoring instructions provide a cross check in which the first monitoring agent and the second monitoring agent both monitor the availability of a first computer application.

5. The method of claim 1, further comprising receiving monitoring data at the central monitoring system from the first monitoring agent in response to sending the updated set of monitoring instructions.

6. A system comprising:
   a computer memory for the storage of instructions;
   a plurality of monitoring agents including a first monitoring agent, the first monitoring agent to receive a set of monitoring instructions including a first work list of systems to monitor for the availability of computer applications run by one or more processors, the first work list including a first effective time value, the first effective time value indicating a time that the first work list of systems to monitor became effective; and
   a central monitoring system, the central monitoring system being operable to generate the plurality of monitoring agents and to provide the first work list to the first monitoring agent, the central monitoring system including a current work list for the first monitoring agent, the current work list including a second effective time value indicating a time that the current work list became effective, the central monitoring system to:
      compare the first effective time value with the second effective time value,
      send the current work list to the first monitoring agent to replace the first work list upon determining that the second effective time value is later than the first effective time value, and
      send a message to the first monitoring agent indicating that the set of monitoring instructions is up-to-date upon determining that the second effective time value is not later than the first effective time value;
   wherein each of the plurality of monitoring agents operates autonomously from the central monitoring system in carrying out monitoring tasks.

7. The system of claim 6, further comprising a second monitoring agent of the plurality of monitoring agents, the second monitoring agent to receive a second work list of systems to monitor for the availability of computer applications, the second work list including a third effective time value.

8. The system of claim 7, wherein the central monitoring system includes a second current work list for the second monitoring agent, the second current work list including a fourth effective time value, the central monitoring system to compare the third effective time value and the fourth effective value, and to send the second current work list to the second monitoring agent upon determining that the fourth effective time value is later than the third effective time value.

9. The system of claim 7, wherein the work list of the first monitoring agent and the work list of the second monitoring agent provide at least in part for monitoring of the availability of computer applications on the same system.

10. The system of claim 9, wherein the first monitoring agent and the second monitoring agent are to perform a cross check of the availability of a first computer application of the one or more computer applications on the same system.

11. The system of claim 9, wherein the system is to switch between the first monitoring agent and the second monitoring agent to monitor the availability of the computer applications on the same system.

12. The system of claim 6, wherein the systems to monitor pursuant to the work list includes a first system, the first system being a system that is compliant with the J2EE™ (Java™2, Enterprise Edition) standard.

13. The system of claim 12, wherein the systems to monitor pursuant to the work list further includes a second system, the second system being a system compliant with ABAP (Advanced Business Application Programming).

14. The system of claim 6, wherein the first monitoring agent obtains data from the monitoring of the availability of computer applications according to the work list and transfers the data to the central monitoring system.

15. A computer-readable storage medium having stored thereon data representing sequences of instructions that, when executed by a processor, cause the processor to perform operations comprising:
   generating by a central monitoring system a plurality of monitoring agents including a first monitoring agent, each of the plurality of monitoring agents operating autonomously from the central monitoring system in carrying out monitoring instructions;
   providing by the central monitoring system a first set of monitoring instructions to the first monitoring agent, the first set of monitoring instructions instructing the first monitoring agent to monitor availability of a first group of computer applications run on one or more processors;
   receiving at the central monitoring system a status inquiry from the first monitoring agent regarding the status of the first set of monitoring instructions, the inquiry including a first time stamp for the first set of monitoring instructions, the first time stamp comprising a time that the first set of monitoring instructions became effective;
   comparing by the central monitoring system the first time stamp received from the first monitoring agent to a second time stamp, the second time stamp being a time stamp for an up-to-date set of monitoring instructions for the first monitoring agent that is held by the central monitoring system;
   determining that the first monitoring agent requires new updated monitoring instructions and sending the up-to-date set of monitoring instructions from the central monitoring system to the first monitoring agent to replace the first set of monitoring instructions if the comparison of the time stamps indicates that the second time stamp is later than the first time stamp; and
   sending a message to the first monitoring agent indicating that the first set of monitoring instructions is up-to-date if the second data stamp is not later than the first time stamp.

16. The computer-readable storage medium of claim 15, wherein the set of instructions instructs the first monitoring agent to monitor the availability of computer applications running on a plurality of different systems.

17. The computer-readable storage medium of claim 16, wherein the first set of monitoring instructions and the second set of monitoring instructions overlap in whole or in part.

18. The computer-readable storage medium of claim 17, wherein the first set of monitoring instructions and the second set of monitoring instructions provide a cross check in which the first monitoring agent and the second monitoring agent both monitor the availability of a first application.

19. The computer-readable storage medium of claim 15, further comprising instructions that, when executed by the processor, cause the processor to perform operations comprising:
   sending a second set of monitoring instructions to a second monitoring agent of the plurality of monitoring agents, the second set of monitoring instructions including a third time stamp.

20. The computer-readable storage medium of claim 19, further comprising instructions that, when executed by the processor, cause the processor to perform operations comprising:
   receiving a status inquiry from the second monitoring agent, the inquiry including the third time stamp; and
   comparing the second time stamp to a fourth time stamp for an up-to-date set of monitoring instructions for the second monitoring agent.

21. The computer-readable storage medium of claim 20, further comprising instructions that, when executed by the processor, cause the processor to perform operations comprising:
   sending the up-to-date set of monitoring instructions for the second monitoring agent to the second monitoring agent if the comparison of the fourth time stamp and the third time stamp indicates that the fourth time stamp is later than the third time stamp; and
   sending a message to the second monitoring agent indicating that there is no change in instructions if the comparison of the fourth time stamp and the third time stamp indicates that the fourth data stamp is not later than the third time stamp.

* * * * *